United States Patent Office 3,652,722
Patented Mar. 28, 1972

3,652,722
RUBBER-MODIFIED POLYESTER THERMOSET
Ray A. Dickie, Pleasant Ridge, and Robert A. Pett, Westland, Mich., assignors to Ford Motor Company, Dearborn, Mich.
No Drawing. Filed Dec. 21, 1970, Ser. No. 100,467
Int. Cl. C08g 45/14, 45/04, 15/00
U.S. Cl. 260—835
10 Claims

ABSTRACT OF THE DISCLOSURE

Novel thermoset materials of improved impact strength and fatigue properties are prepared from an alpha-beta olefinically unsaturated polyester prepolymer and a crosslinking amount of particulate graded-rubber having alpha-beta olefinic-unsaturation surface functionality. The graded-rubber particles have a rubbery core and a glass-like polymeric outer shell.

THE INVENTION

This invention is concerned with novel thermoset materials for molding and with the molded products thereof. The thermoset materials of this invention comprise an alpha-beta olefinically unsaturated polyester prepolymer and graded-rubber particles having alpha-beta olefinic-unsaturation surface functionality. Thermosets of this invention are compatible with conventional molding techniques, e.g., compression, injection, etc., and applicable to the production of structural materials as, for instance, automobile structural panels, electrical appliance housings, boat construction, conduits, etc.

(I) The polyester resin component

The alpha-beta olefinically unsaturated polyesters used herein advantageously have average molecular weight in the range of about 1,000 to about 20,000, preferably in the range of about 2,000 to about 10,000. The polyester advantageously has between about 0.5 and about 5, preferably about 0.7 to about 3.5, units of alpha-beta olefinic unsaturation per 1,000 units molecular weight.

The polyesters used herein are well known in the art, as evidenced U.S. Pat. 3,437,514 to W. J. Burlant, and hence can be prepared by conventional processing techniques. Most commonly, these polyesters consist essentially of carbon, hydrogen and oxygen. In one embodiment, the polyesters are formed from a diol, e.g., neopentyl glycol, propylene glycol, etc., an alpha-beta olefinically unsaturated dicarboxylic acid and/or anhydride, e.g., maleic anhydride, fumaric acid, itaconic anhydride, etc., and a dicarboxylic acid an/or anhydride that does not provide additional olefinic unsaturation, i.e., a saturated or aromatic acid or anhydride. Most commonly, this second acid or anhydride will be a dicarboxylic acid or anhydride wherein the acid groups or anhydride group are attached to a ring structure which may be aromatic (phthalic anhydride) or aliphatic (tetrahydrophthalic anhydride).

The term "alpha-beta olefinic unsaturation" as employed herein refers to the olefinic unsaturation resulting from the incorporation of maleic anhydride or other acid or anhydride of equivalent unsaturation.

The anhydride wherein the anhydride group is attached to a ring structure (aromatic or aliphatic) is selected from anhydrides that will not provide additional alpha-beta olefinic unsaturation units and the relative quantities of the two acids and/or anhydrides are adjusted to provide the desired concentration of such unsaturation. Suitable anhydrides for this purpose include, but not by way of limitation, phthalic, tetrahydrophthalic, cyclohexane dicarboxylic acid anhydride, etc.

The polyhydric alcohol is preferably a diol. Triols and other multi-hydric alcohols can be used but it is advisable to employ such alcohols in minor amounts with a diol, if they are used at all. Suitable diols include, but not by way of limitation, ethylene glycol, propylene glycol, 1,3-butylene glycol, 2-butene-1,4 diol, 1,4-butane glycol, 1,6-hexamethylene glycol, decamethylene glycol, dimethylol benzenes, dihydroxy ethyl benzenes, etc.

(II) Preparation of the graded-rubber particle

The graded-rubber particle has a core of crosslinked, elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these particulate materials is at least a two-stage process. In one method of preparation, a major amount of mono-functional monoacrylate is emulsion copolymerized in the first stage with a crosslinking amount of a di- or tri-functional monomer containing two or more nonconjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., a mixture of about 65 to about 98, preferably about 70 to about 95, mole percent methyl methacrylate, and about 2 to about 35, preferably about 5 to about 30 mole percent of an epoxy acrylate, e.g. glycidyl methacrylate, or about 2 to about 35 mole percent of the epoxy acrylate and about 65 ot about 98 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component. Alpha-beta olefinic unsaturation is introduced by reacting the epoxy groups provided by the epoxyacrylate with an alpha-beta olefinically unsaturated monocarboxylic acid, e.g. acrylic acid, methacrylic acid, etc.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms rubber-like and glass-like are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or trifunctional monomer containing 2 or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate, and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene diacrylate, 1,6-hexamethylene dimethacrylate, 1,1,1,-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the crosslinking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the crosslinking agent.

In the second stage reaction, it is preferred to use a mixture of about 65 to about 99, preferably about 70 to about 95 mole percent methyl methacrylate and about 1 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2$–$C_8$ monohydric alcohols and either acrylic or methacrylic acid, or monofunctional vinyl hydrocarbons such as styrene and methyl substituted styrenes, e.g. alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_6$ dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate, sodium oleate; sodium alkyl aryl sulfonates; polyoxyethylene sulfates and phosphates; the ethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner, further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agent such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

(III) Molding composition

The molding composition exclusive of reinforcing fibers, particles, etc., commonly consists essentially of a major amount by weight of the graded-rubber particles. The concentration of graded-rubber particles homogeneously dispersed in the final product can be varied over a wide range in conformance with the properties desired for such product. Thus, it may be advisable in certain instances for this concentration to range upward from a minimum modifying amount to a major fraction by weight. In the main, however, the concentration and composition of the graded-rubber particles will be such that the elastomeric cores will comprise a minor proportion by weight of the final product, commonly between about 5 and about 40, more commonly between about 10 and about 30, weight percent of the final product. The weight relationship of the glass-like outer shell to the elastomeric core can be varied but for most purposes the weight of the outer shell will not substantially exceed that of the core. In most instances, the average weights of the outer shells will be about 10 to about 60, preferably about 20 to about 50, percent of the average weight of the cores.

Any of the commonly available free-radical catalysts such as azo compounds, peroxides and peresters may be used to effect cure during the molding process. In some cases, accelerators to enhance cure rate such as dimethyl toluidine, cobalt napthenate and benzoic sulfinimide may also be added in less than two percent amounts. In some cases, to provide stability at room temperature, and fast cure at elevated temperatures, accelerators may be used in combination with inhibitors such as 2,6-ditertiary butyl phenol, hydroquinone, hydroquinone monomethyl ether in amounts less than one percent of the total.

Vinyl monomers, e.g. styrene, may be added to the composition to adjust the viscosity to a suitable level for the desired molding or processing technique. Nonreactive solvents may also be used in some embodiments to facilitate distribution of the rubber particles and subsequently removed under reduced pressure.

This invention will be more fully understood from the following examples which illustrate the thermoset materials hereinbefore described and hereinafter claimed.

EXAMPLE 1

A polyester prepolymer, known hereinafter as Resin A, is prepared according to procedures well known in the art from an equimolar mixture of orthophthalic acid and maleic anhydride and neopentyl glycol in an amount 5% in excess of the stoichiometric requirement.

To 1,000 parts by weight water which has been boiled and cooled to room temperature under a nitrogen atmosphere are added 2.86 parts by weight sodium dodecyl sulfate dissolved in 35.7 parts by weight water and about ⅛ of a monomer mixture consisting of 348 parts by weight butyl acrylate and 32.3 parts by weight 1,3-butylene dimethacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of (1) a mixture of 236 parts by weight methyl methacrylate, 143.4 parts by weight glycidyl methacrylate, and 2.57 parts by weight 1-dodecanethiol, and (2) a solution of 5.72 parts by weight sodium dodecyl sulfate in 35.7 parts by weight water. This addition, which requires about 40 minutes, is carried out at such a rate that the temperature of the reaction mixture is maintained at 47 to 49° C. Following this addition, the mixture is maintained at 47 to 49° C. for an additional two hours. The resulting latex, known hereinafter as Latex A, is cooled to room temperature. The overall conversion of monomers is about 98%. The average size of these particles is in the range of 0.1 to 0.2 micron.

Latex A is coagulated by adding one volume of latex to approximately 4 volumes of methyl alcohol to which has been added 0.001 volume concentrated hydrochloric acid. The coagulum is isolated by filtration, washed with several volumes of methyl alcohol, and with water, and is dried in vacuo to yield Powder A.

Twenty parts by weight of Powder A are dispersed in 200 parts by weight unpurified commercial styrene monomer. To this dispersion is added methacrylic acid in an amount providing about one carboxyl group per each epoxy group in the outer shells of the rubber particles and a catalytic amount (0.1 part by weight based on methacrylic acid) benzyl triethyl ammonium chloride. The dispersion is heated until the reaction between the methacrylic acid and the epoxy groups on the graded elastomeric particles is at least 50% complete.

The resulting dispersion is blended with an appropriate amount (as hereinafter defined) of Resin A and benzoyl peroxide. Sufficient styrene monomer is removed by vacuum distillation to yield a final molding composition comprising 20% by weight rubber (based on the core portion of the graded particles) for a total of 40% by weight graded particles and 60% by weight polyester-styrene present in weight ratio 65:35; the benzoyl peroxide concentration is 2% by weight based on polyester-styrene content. The blend is molded for 15 minutes at 115° C. and postcured at 120° C. for 3 hours to yield a hard, acetone-insoluble article. Room temperature tensile properties are given below:

Elongation-to-break, percent _____ 7.5
Stress-at-break, p.s.i. _____ 5700
Modulus, p.s.i. _____ 292,000

EXAMPLE 2

For purposes of comparison, Resin R is blended with styrene monomer in weight ratio of 65:35 and 2% by weight benzoyl peroxide is added. The blend is molded at 115° C. for 15 minutes and postcured at 120° C. for three hours to yield a hard, acetone insoluble article. Room temperature tensile properties are given below:

Elongation-to-break, percent _____ 3.1
Stress-at-break, p.s.i. _____ 8100
Modulus, p.s.i. _____ 418,000

EXAMPLE 3

The procedures of Example 1 are repeated with the difference that acrylic acid replaces methacrylic acid in the modification of the graded-rubber particles.

EXAMPLE 4

To 1000 parts by weight water which has been boiled and cooled to room temperature under a nitrogen atmosphere are added 2.86 parts by weight sodium dodecyl sulfate dissolved in 35.7 parts by weight water and about ⅛ of a monomer mixture consisting of 521 parts butyl acrylate and 48.5 parts by weight of 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° C. During the addition of the last two thirds of the first monomer mixture, 5.72 parts by weight sodium dodecyl sulfate dissolved in 35.7 parts by weight water are added at a substantially constant rate. The reaction mixture is maintained at 47° to 50° for about 40 minutes prior to beginning simultaneous dropwise addition of (1) 190 parts by weight of a monomer mixture consisting of methyl methacrylate, styrene, and glycidyl methacrylate present in mole rate 35:35:30, and (2) 2.86 parts by weight sodium dodecyl sulfate dissolved in 35.7 parts by weight water. This addition is carried out at such a rate that the mixture is maintained at 47° to 50° C. Following this addition, the temperature is held at 47° to 50° C. for an additional two hours. The resulting latex as Latex B, is cooled to room temperature.

A portion of Latex B is coagulated by adding one volume of latex rapidly but dropwise to approximately four volumes of rapidly stirred methyl alcohol which has been heated to about 60° C. before beginning the coagulation. The resulting coagulum is filtered, washed, and dried in vacuo to yield a white powder hereinafter known as Powder B.

Twenty parts by weight of Powder B are dispersed in 500 parts by weight unpurified commercial styrene monomer. To this dispersion is added methacrylic acid in an amount providing about one carboxyl group per each epoxy group in the outer shells of the rubber particles and a catalytic amount (0.05 part by weight based on methacrylic acid) benzyltriethylammonium chloride. The dispersion is heated until the reaction between the methacrylic acid and the epoxy groups on the graded elastomeric particles is at least 50% complete.

The resulting dispersion is blended with an appropriate amount of Resin A (alpha-beta olefinically unsaturated polyester) and benzoyl peroxide; styrene monomer is removed by vacuum distillation to yield a molding material comprising 20% by weight rubber (based on the core portion of the graded-rubber particles) for a total of 26.7% by weight graded-rubber particles and 73.3% by weight polyester-styrene present in weight ratio 65:35; the benzoyl peroxide concentration is 2% by weight based on polyester-styrene content.

The blend is molded for 15 minutes at 115° C. and postcured at 120° C. for three hours to yield a hard, acetone-insoluble article. Room temperature tensile properties are given below:

Elongation-to-break, percent _____ 6.2
Stress at break, p.s.i. _____ 7200
Modulus, p.s.i. _____ 300,000

EXAMPLE 5

The procedures of Example 4 are repeated with the difference that acrylic acid replaces methacrylic acid in the modification of the graded-rubber particles.

EXAMPLE 6

The composite molding material of Example 4 is used in preparation of a glass fibre reinforced composite containing 20% by volume ⅛" polyester compatible chopped glass fibres. Room temperature tensile properties of this material as well as of a composite based on the polyester-styrene molding compound of Example 2 containing 20% by volume ⅛" chopped glass fibres are given below:

|  | Elongation-to-break, percent | Stress at break, p.s.i. | Modulus, p.s.i. |
|---|---|---|---|
| Polyester/styrene/glass mold | 0.7 | 8,300 | 1,400,000 |
| Polyester/styrene/rubber/glass mold | 1.2 | 12,000 | 1,100,000 |

In addition to displaying markedly superior strength, the rubber - reinforced glass - containing composite displays much better retention of modulus on repeated stressing.

EXAMPLE 7

The procedures of the preceding examples are repeated with the difference that the polyester resin is formed from an equimolar mixture of orthophthalic acid and maleic anhydride with propylene glycol in an amount 5% in excess of the stoichiometric requirement.

EXAMPLE 8

The procedures of the preceding examples are repeated with the difference that vinyl toluene is substituted for styrene.

EXAMPLE 9

The procedure of Example 1 is repeated except for the difference that in the preparation of the polyester prepolymer there is substituted an equimolar amount of tetrahydrophthalic anhydride for the orthophthalic acid and an equimolar amount of fumaric acid for the maleic anhydride.

EXAMPLE 10

The procedure of Example 1 is repeated except for the difference that in the preparation of the polyester prepolymer equimolar amount of cyclohexane dicarboxylic acid is substituted for the orthophthalic acid and an equimolar amount of propylene glycol is substituted for the neopentyl glycol.

EXAMPLE 11

The procedure of Example 1 is repeated except for the difference that in the preparation of the polyester prepolymer there is substituted an equimolar amount of ethylene glycol for the neopentyl glycol and an equimolar amount of itaconic anhydride is substituted for the maleic anhydride.

EXAMPLE 12

The procedure of Example 1 is repeated except for the difference that in the preparation of the polyester prepolymer there is substituted an equimolar amount of 2-butene-1,4 diol for the neopentyl glycol.

EXAMPLE 13

The procedure of Example 1 is repeated except for the difference in the preparation of the polyester prepolymer there is substituted an equimolar amount of 1,6-hexamethylene glycol for the neopentyl glycol.

EXAMPLE 14

The procedure of Example 1 is repeated except for the difference in the preparation of the polyester prepolymer an equimolar amount of 1,2-propanediol is substituted for the neopentyl glycol.

EXAMPLE 15

The procedure of Example 1 is repeated except for the difference in the preparation of the graded-rubber particles wherein the monomer mixture employed to form the outer shell is a mixture of about 30 mole percent methyl methacrylate, 20 mole percent ethyl acrylate, 10 mole percent vinyl acetate, 10 mole percent butyl methacrylate, 10 mole percent methacrylonitrile, 10 mole percent vinyl toluene and 10 mole percent glycidyl methacrylate. The monomer mixture excepting the glycidyl methacrylate is divided into 3 equal portions. The first two portions are added dropwise to the reaction mixture. The glycidyl methacrylate is mixed with the third portion and this mixture is then added dropwise to the reaction mixture.

EXAMPLE 16

The procedure of Example 1 is repeated except for the difference in the preparation of the graded-rubber particles wherein the core is prepared from about 90 mole percent 2-ethyl hexyl acrylate and 10 mole percent 1,3-butylene diacrylate and the monomer mixture employed to form the outer shell is a mixture of 40 mole percent methyl methacrylate, 10 mole percent acrylonitrile, 10 mole percent butyl acrylate, 10 mole percent alpha methyl styrene and 30 mole percent of glycidyl methacrylate.

EXAMPLE 17

The procedure of Example 16 is repeated except for the difference that glycidyl acrylate is substituted for the glycidyl methacrylate.

EXAMPLE 18

The procedure of Example 1 is repeated except for the difference in the preparation of the graded-rubber particles wherein the core is prepared from about 90 mole percent butyl acrylate and about 40 mole percent of divinyl benzene and the monomer mixture employed to form the outer shell is a mixture of 60 mole percent methyl methacrylate, 30 mole percent glycidyl methacrylate and 10 mole percent divinyl benzene.

EXAMPLE 19

The procedure of Example 1 is repeated except that the components of the molding composition are adjusted to provide an elastomer concentration in the molded article of 40 weight percent.

EXAMPLE 20

The procedure of Example 1 is repeated except that the components of the molding composition are adjusted to provide an elastomer concentration in the molded article of 30 weight percent.

EXAMPLE 21

The procedure of Example 1 is repeated except that the components of the molding composition are adjusted to provide an elastomer (core) concentration in the molded article of 10 weight percent.

EXAMPLE 22

The procedure of Example 1 is repeated except for the components of the molding composition are adjusted to provide an elastomer (core) concentration in the molded article of 5 weight percent.

EXAMPLE 23

The procedure of Example 1 is repeated except that in the preparation of the polyester the constituent monomers are employed in the following relative amounts:

|  | G. |
|---|---|
| Orthophthalic acid | 166 |
| Maleic anhydride | 294 |
| Neopentyl glycol | 218 |

EXAMPLE 24

The procedure of Example 1 is repeated except that in the preparation of the polyester the constituent monomers are employed in the following relative amounts:

|  | G. |
|---|---|
| Orthophthalic acid | 498 |
| Maleic anhydride | 98 |
| Neopentyl glycol | 218 |

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the amended claims. Those skilled in the art will be aware that modifications may be made therein without departing from the scope of the invention as set forth in the appended claims.

We claim:

1. A thermoset product molded from an alpha-beta olefinically unsaturated polyester prepolymer of a diol, an alpha-beta olefinically unsaturated dicarboxylic acid or anhydride thereof, and a saturated or aromatic dicarboxylic acid or anhydride thereof, having molecular weight in the range of about 1,000 to about 20,000 and containing about 0.5 to about 5 units of alpha-beta olefinic unsaturation per 1,000 units molecular weight and a crosslinking amount of graded-rubber particles having alpha-beta olefinic-unsaturation surface functionality consisting essentially of
    (1) about 10 to about 90 weight percent of an elastomeric core of crosslinked acrylic polymer consisting essentially of
        (a) about 80 to about 98 mole percent of a monoester of acrylic acid and a $C_2$–$C_8$ monohydric alcohol, and
        (b) about 20 to about 2 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol, and
    (2) about 90 to about 10 weight percent of an outer shell consisting essentially of the polymerization product of monomer mixtures selected from the group consisting of
        (a) about 65 to about 98 mole percent methyl methacrylate and about 2 to about 35 mole percent of an epoxy-functional acrylate, and
        (b) about 2 to about 35 mole percent of an epoxy-functional acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate,
and being provided with alpha-beta olefinic-unsaturation surface functionality by reacting at least a major portion of the resultant epoxy groups on the surfaces of said outer shell with an alpha-beta olefinically unsaturated monocarboxylic acid the relative proportions of said polyester prepolymer and said graded-rubber particles being such that the elastomeric cores of said graded-rubber particles comprise between about 5 and about 40 weight percent of the molded product.

2. A thermoset product in accordance with claim 1 wherein said alpha-beta olefinically unsaturated monocarboxylic acid is acrylic acid.

3. A thermoset product in accordance with claim 1 wherein said alpha-beta olefinically unsaturated monocarboxylic acid is methacrylic acid.

4. A thermoset product in accordance with claim 1 wherein said outer shell has glass transition temperature at least 50° C. above that of said core.

5. A thermoset product in accordance with claim 1 wherein said polyester prepolymer contains between about 0.7 and about 3.5 units of alpha-beta olefinic unsaturation per 1,000 units of molecular weight.

6. A thermoset product in accordance with claim 1 wherein said outer shells of said graded-rubber particles comprise between about 10 and about 60 percent of the average weight of the cores of said particles.

7. A thermoset product in accordance with claim 1 wherein said polyester prepolymer has average molecular weight in the range of about 2,000 to about 10,000.

8. A thermoset product in accordance with claim 1 wherein said alpha-beta olefinically unsaturated dicarboxylic acid or anhydride thereof is maleic anhydride.

9. A thermoset product in accordance with claim 1 wherein said saturated or aromatic dicarboxylic acid or anhydride thereof is phthalic anhydride.

10. A thermoset product in accordance with claim 1 wherein said saturated or aromatic dicarboxylic acid or anhydride thereof is tetrahydrophthalic anhydride.

References Cited

UNITED STATES PATENTS

| 3,423,481 | 1/1969 | Mizutani | 260—836 |
| 3,450,796 | 6/1969 | Griffin | 260—885 |
| 3,502,745 | 3/1970 | Minton | 260—881 |

FOREIGN PATENTS

| 1,132,645 | 11/1968 | Great Britain | 260—836 |

PAUL LIEBERMAN, Primary Examiner

U.S. Cl. X.R.

260—836, 862, 872, 876 R, 881, 885, 886